G. A. CULVER.
LAWN MOWER.
APPLICATION FILED NOV. 2, 1908.
957,145.
Patented May 3, 1910.
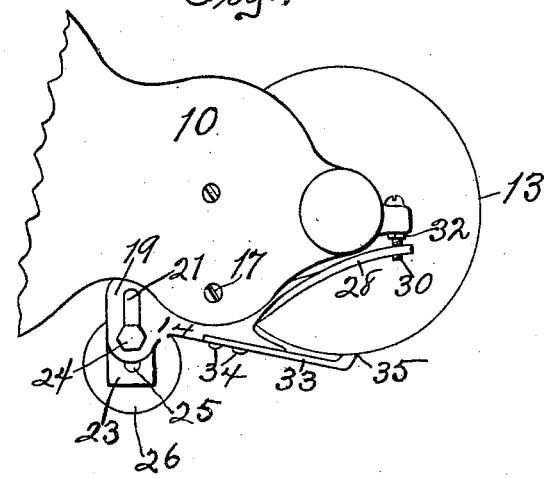
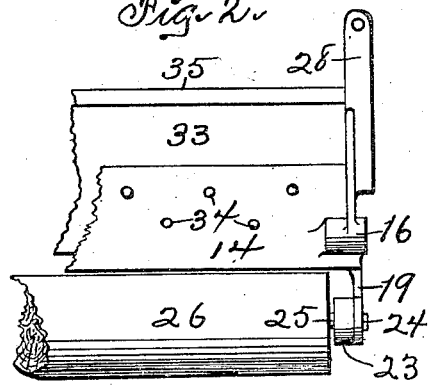
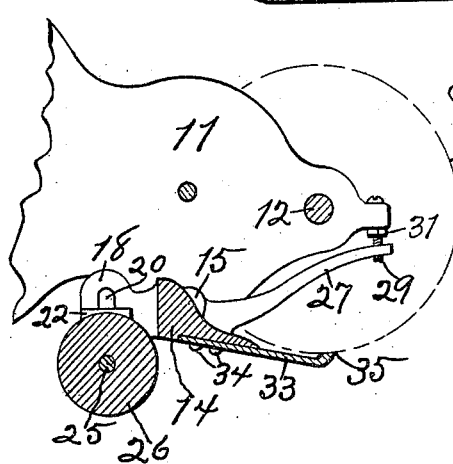

UNITED STATES PATENT OFFICE.

GEORGE A. CULVER, OF CLARINDA, IOWA.

LAWN-MOWER.

957,145.  Specification of Letters Patent.  Patented May 3, 1910.

Application filed November 2, 1908. Serial No. 460,585.

*To all whom it may concern:*

Be it known that I, GEORGE A. CULVER, a citizen of the United States of America, and resident of Clarinda, Page county, Iowa, have invented a new and useful Improvement in Lawn-Mowers, of which the following is a specification.

The object of this invention is to provide an improved construction and adjustment for knife-bars or cutter-bars of lawn mowers employing a cutter reel.

My invention consists in the construction, arrangement and combination of elements hereinafter set forth, pointed out in my claims and illustrated by the accompanying drawing, in which—

Figure 1 is a side elevation of parts of a lawn mower embodying my invention. Fig. 2 is a plan of portions of my improved devices detached from the remaining parts of a lawn mower. Fig. 3 is a cross-section showing an elevation of the parts opposite to the end shown in Fig. 1.

This invention relates to and is an improvement of parts of the mechanism of the lawn mower shown and described in my application for Letters Patent of the United States filed September 4, 1908 and serially numbered 452,163, to which reference is hereby made.

In the construction of the devices as shown the numerals 10, 11 designate forward end portions of housings adapted to contain gearing (not shown) employed to drive a shaft 12. The shaft 12 is adapted to support and drive a reel cutter (not shown) which may be of any desired form preferably that shown in my application above referred to, the outline or orbit of the cutting edges of the reel cutter being indicated by the circles 13 in Figs. 1 and 3. A knife bar 14 is provided and is mounted transversely of and below the housings 10, 11 and extends from one to the other of said housings. Ears 15, 16 are formed on and project upward from end portions of the knife bar 14 between the housings 10, 11 and screws 17, one of which is shown in Fig. 1, are mounted through the housings and journaled in said ears, so that the screws serve as pivots for oscillation of the knife bar. Arms 18, 19 extend rearward from end portions of the knife bar 14 and are formed with vertical slots 20, 21 respectively. Bearing blocks 22, 23 are mounted in contact with the inner faces of the arms 18, 19 and cap screws 24, one of which is shown in Fig. 1, are mounted through the slots 20, 21 and seated in the upper portions of said blocks. By means of the cap screws 24 the bearing blocks 22, 23 are clamped rigidly to the arms 18, 19 and may be adjusted vertically throughout the length of the slots 20, 21, thus providing for vertical adjustment of the bearing blocks relative to the housings. A shaft 25 is journaled at its ends in the lower portions of the bearing blocks 22, 23 and a roller 26 is mounted on said shaft between said blocks. The roller 26 is adapted to engage and roll on the surface of the lawn over which the machine is advanced and govern, regulate and determine the elevation of the forward ends of the housings.

Arms 27, 28 are formed on and extend forward from end portions of the knife bar 14 and extend also beneath the forward ends of the housings 10, 11. Bolts 29, 30 are mounted loosely through vertical apertures formed in the forward ends of the housing 10, 11 and are screwed into seats formed vertically of the forward ends of the arms 27, 28. Locking nuts 31, 32 are mounted on the bolts 29, 30 between the arms 27, 28 and the adjacent ends of the housings and are tightened against the housings to prevent accidental turning of the bolts in and accidental adjusting of the arms. A rabbet is formed in the lower face of the knife bar 14 and a cutter bar or knife 33 is mounted therein and secured to the bar 14 preferably by rivets 34. The forward margin of the cutter or knife 33 is turned upwardly and beveled to form a cutting edge 35 coincident with the orbit 13 of the reel cutter. The elevation of the housings, and consequently of the reel shaft 12, is governed and controlled by adjustment of the bearing blocks 22, 23 and screws 24 relative to the arms 18, 19. The relation of the cutting edge 35 of the knife 33 to the orbit of the reel cutter is regulated, adjusted and determined by raising and lowering the forward ends of the arms 27, 28 through the medium of the bolts 29, 30 and the locking nuts 31, 32.

I claim as my invention—

1. In a lawn mower, housings, a reel-shaft mounted on and connecting said housings, a knife-bar arranged parallel with and for oscillation to and from said reel-shaft, vertically slotted arms projecting rearwardly from end portions of said knife-bar, bearing-blocks mounted on and adjustable vertically of said slotted arms, a roller carried by said blocks, a knife on said bar, arms extending forwardly and upwardly from end portions of said bar, and adjusting bolts mounted vertically in forward end portions of said housings and engaging the latter arms.

2. In a lawn mower, housings, a reel shaft mounted on and connecting said housings, a knife bar mounted on and connecting said housings parallel with the reel shaft, slotted arms on and extending rearwardly from said knife bar, a roller journaled on and adjustable vertically of said slotted arms, arms on and extending forwardly from said knife bar, adjusting bolts in the housings and engaging said forwardly-extending arms, and a knife on said bar parallel with the reel shaft.

3. In a lawn mower, housings, a reel shaft mounted on and connecting forward end portions of said housings, a knife bar journaled on said housings parallel with and at the rear of said reel shaft, a roller adjustably mounted on said knife bar at the rear of the axis thereof, a knife on said bar parallel with the reel shaft, arms extending forwardly from ends of the knife bar and beneath the forward ends of the housings, and adjusting devices connecting the forward ends of said arms and the housings.

4. In a lawn mower, housings, a reel shaft mounted on and connecting forward end portions of said housings, a knife bar extending transversely of said housings parallel with and at the rear of said reel shaft, ears on end portions of said knife bar and journaled to said housings, arms extending rearwardly from said knife bar and formed with vertical slots, screws vertically adjustable in and extending through the slots of the arms, bearing blocks on said screws between the arms, a shaft journaled in said bearing blocks below the screws, a roller on said shaft, arms extending forward from ends of the knife bar and beneath the forward ends of the housings, adjusting devices connecting the forward ends of said arms and housings, and a knife on said bar parallel with the reel shaft.

Signed by me at Des Moines, Iowa, this twenty ninth day of October, 1908.

GEORGE A. CULVER.

Witnesses:
THOMAS G. ORWIG,
S. C. SWEET.